US010859138B2

(12) United States Patent
Felisa et al.

(10) Patent No.: US 10,859,138 B2
(45) Date of Patent: Dec. 8, 2020

(54) PRECISION PLANETARY GEAR

(71) Applicant: SAMP S.P.A. CON UNICO SOCIO, Bentivoglio (IT)

(72) Inventors: Giuseppe Felisa, Bentivoglio (IT); Daniele Fioretti, Bentivoglio (IT)

(73) Assignee: SAMP S.P.A. CON UNICO SOCIO, Bentivoglio (IT)

( * ) Notice: Subject to any disclaimer, the term of this patent is extended or adjusted under 35 U.S.C. 154(b) by 0 days.

(21) Appl. No.: 15/760,856

(22) PCT Filed: Sep. 16, 2016

(86) PCT No.: PCT/IB2016/055547
§ 371 (c)(1),
(2) Date: Mar. 16, 2018

(87) PCT Pub. No.: WO2017/046767
PCT Pub. Date: Mar. 23, 2017

(65) Prior Publication Data
US 2020/0240490 A1 Jul. 30, 2020

(30) Foreign Application Priority Data

Sep. 17, 2015 (IT) .................. 102015000052630

(51) Int. Cl.
*F16H 1/28* (2006.01)
(52) U.S. Cl.
CPC ......... *F16H 1/2836* (2013.01); *F16H 1/2854* (2013.01); *F16H 1/2863* (2013.01); *F16H 2001/2872* (2013.01)
(58) Field of Classification Search
CPC .... F16H 1/2836; F16H 1/2854; F16H 1/2863; F16H 2001/2872
See application file for complete search history.

(56) References Cited

U.S. PATENT DOCUMENTS 1,499,763 A * 7/1924 Davis .................. F16H 1/28
475/336
5,910,066 A * 6/1999 Schulz ................ F16H 1/2863
475/331

(Continued)

FOREIGN PATENT DOCUMENTS

| DE | 19510499 | 9/1996 |
| DE | 19525831 | 1/1997 |
| DE | 19756967 | 6/1999 |
| DE | 102010046958 | 4/2011 |

OTHER PUBLICATIONS

Beam, Beveloid Gearing, Machine Design, vol. 26, Dec. 1954, pp. 220-238.

(Continued)

*Primary Examiner* — David J Hlavka
(74) *Attorney, Agent, or Firm* — McCarter & English, LLP

(57) ABSTRACT

A precision planetary gear comprising: a pinion; a movable annular gear; a fixed annular gear; one or more planet gears; wherein each planet gear simultaneously meshes with the pinion, the fixed annular gear and the movable annular gear; the pinion comprising a gear with a beveloid toothing; each planet gear comprising a gear with a beveloid toothing; wherein a beveloid toothing has a correction, which linearly varies along the longitudinal direction of the tooth; wherein each tooth of the beveloid toothing has a thickness and a height which increase moving from the apex of said beveloid gear along the longitudinal direction of the tooth.

19 Claims, 6 Drawing Sheets

(56) References Cited

U.S. PATENT DOCUMENTS

| | | | | |
|---|---|---|---|---|
| 5,957,804 A * | 9/1999 | Schulz | ............... | F16H 1/2863 |
| | | | | 475/331 |
| 6,117,036 A * | 9/2000 | Lanzon | ............ | B60K 17/344 |
| | | | | 475/204 |
| 6,123,640 A * | 9/2000 | Schulz | ............ | F16H 1/46 |
| | | | | 475/341 |
| 7,500,935 B2 * | 3/2009 | Waide | ............ | B64C 27/14 |
| | | | | 475/336 |
| 9,879,760 B2 * | 1/2018 | Tesar | ............ | H02K 7/116 |
| 2005/0026735 A1 * | 2/2005 | Tiesler | ............ | F16H 3/66 |
| | | | | 475/269 |
| 2005/0026740 A1 * | 2/2005 | Tiesler | ............ | F16H 3/66 |
| | | | | 475/278 |
| 2005/0026742 A1 * | 2/2005 | Tiesler | ............ | F16H 3/66 |
| | | | | 475/284 |
| 2015/0211606 A1 * | 7/2015 | Lieder | ............ | F16H 1/46 |
| | | | | 475/162 |

OTHER PUBLICATIONS

Merritt, Gears, Chapter 10 The Geometery of Spiral and Conical Involute Gears, Pitman, London, 1955, pp. 165-170.

Purkiss, Conical Involute Gears: part 1, Machinery 89, 1956, pp. 1403-1420.

Liu, et al., Contact Characteristics of Beveloid Gears, Mechanical Machine Theory, No. 37, 2002, pp. 333-350.

PCT International Search Report and Written Opinion for PCT/IB2016/055547 dated Jan. 31, 2017.

\* cited by examiner

PRECISION PLANETARY GEAR

CROSS-REFERENCE TO RELATED APPLICATIONS

This application is a 35-U.S.C. § 371 National Stage filing of International Application No. PCT/IB2016/055547, filed on Sep. 6, 2016, which claims priority to Italian Patent Application IT 102015000052630, filed on Sep. 17, 2015.

TECHNICAL FIELD

This patent application relates to a precision planetary gear, for example to be applied to robotic machines for the operation of mechanical arms.

In particular the invention relates to a planetary gear, which is configured to be installed close to the articulations of a mechanical arm and is capable of transmitting the necessary torques ensuring at the same time: an accurate transfer of the angular position, small dimensions, light weight and stiffness to external loads.

BACKGROUND ART

Planetary gears are known, which have bevel gears to compensate the axial thrusts exerted upon the gears of the planetary gear itself.

Furthermore, in order to limit backlashes between the bevel gears, it is known to provide an axial thrust system with a spring, which keeps the teeth of the bevel gears in contact with one another.

The planetary gears described above are affected by the drawback of not being sufficiently precise and of having a limited gear ratio.

DISCLOSURE OF INVENTION

The object of the invention is to provide a planetary gear, which overcomes the drawbacks described above.

In particular, the object of the invention is to provide a precision planetary gear, which is compact and cheap as well as has: a high gear ratio; good performances; and lack of backlashes between the gears.

According to the present invention, there is provided a planetary gear according to the appended claims.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
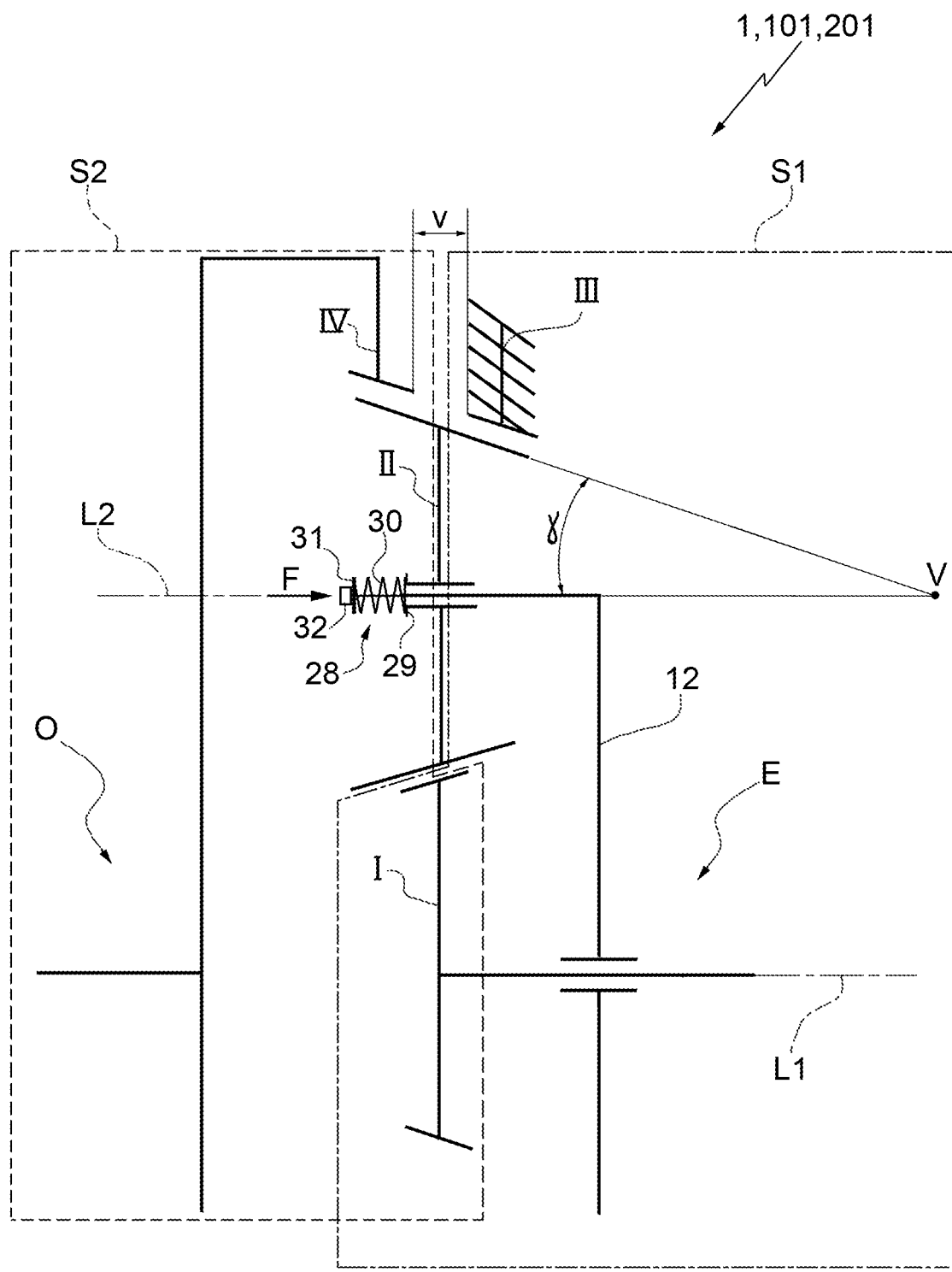
FIG. 1 is a schematic representation of the structure of the planetary gear according to the invention.
Figure 2:
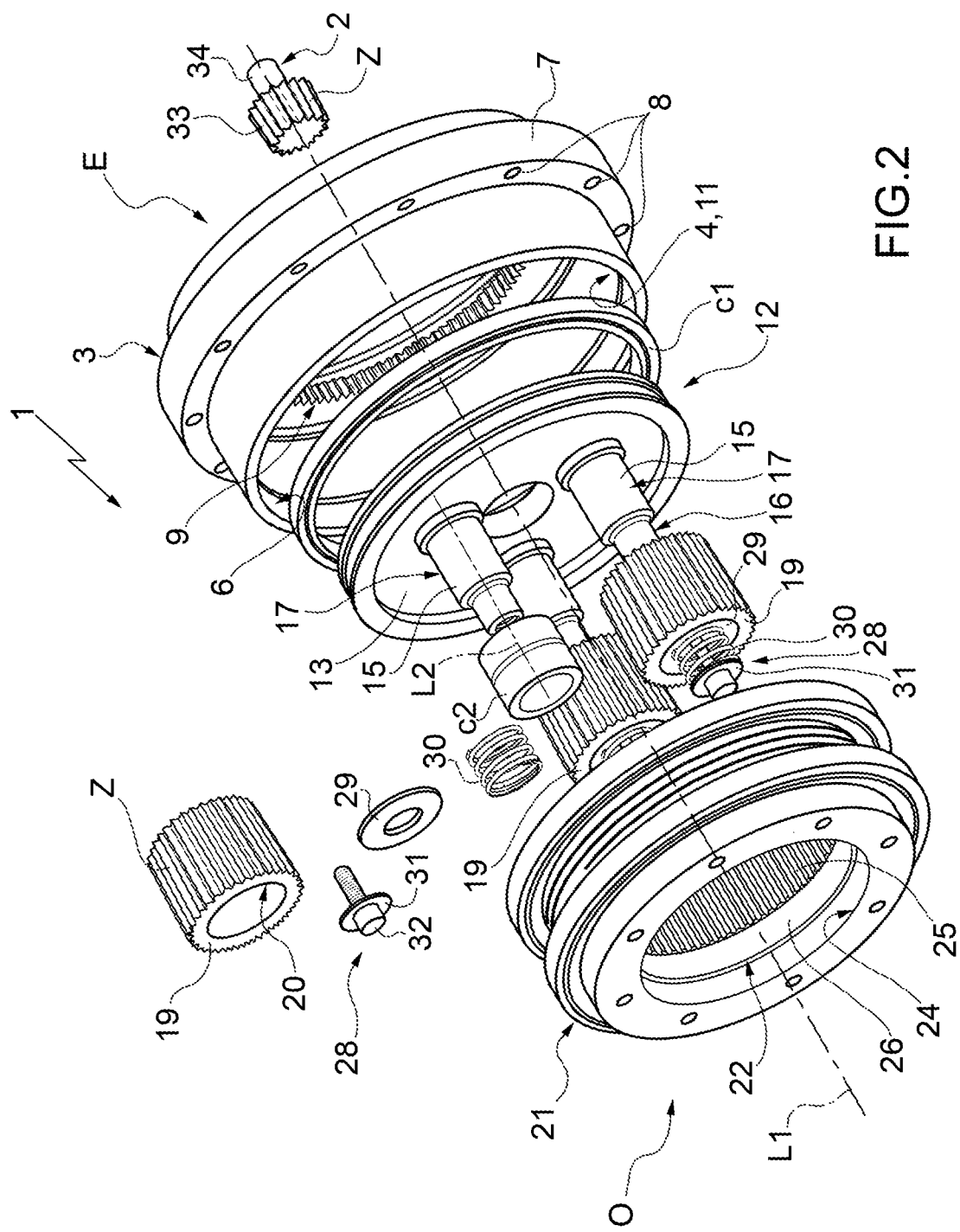
FIG. 2 is an exploded view of the planetary gear according to the invention.
Figure 3:
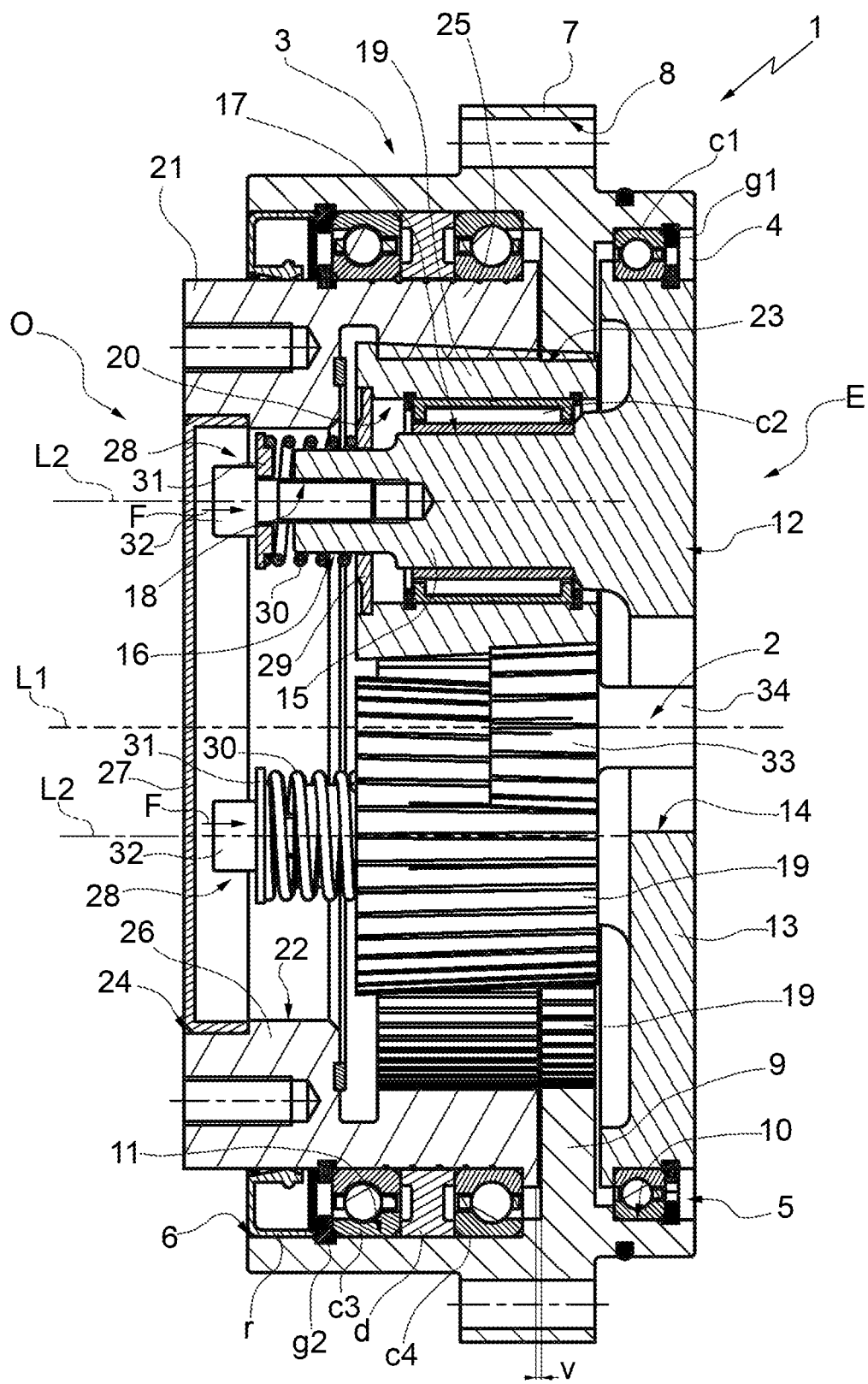
FIG. 3 is a longitudinal section of the planetary gear of FIG. 2.

In FIGS. 1 to 3, number 1 indicates, as a whole, a planetary gear having an input side E and an output side O. By "input side E" we mean the side of the planetary gear 1 that is configured to receive and be coupled to a pinion 2, which is connected in a known manner to an external motor (non shown), in particular an electric motor. By "output side O" we mean the side that is configured to be coupled to a component (not shown), for example a mechanical arm, to which it transmits a motion.

According to FIGS. 2 and 3, the planetary gear 1 comprises an outer cylindrical casing 3, which has an inner through cavity 4 and a longitudinal axis L1. The cavity 4 faces the outside of the casing 3 through the end openings 5 and 6 located in the area of the input side E and of the output side O, respectively. Advantageously, the cavity 4 is capable of housing a lubricant sealing system (known and, therefore, not shown), so as to seal the planetary gear 1 and protect it against contaminations.

The casing 3 is configured to remain stationary during the use of the planetary gear 1. In particular, the casing 3 comprises a flange 7, which radially projects outwards from the planetary gear 1 and has holes 8, which are uniformly distributed around the axis L1 for the passage of screws (not shown), which are capable of fixing the casing 3 to a respective arm (not shown) of a robotic machine.

The planetary gear 1 comprises, furthermore, a fixed annular gear 9, which is coupled to the casing 3 in an angularly and axially fixed manner. The fixed annular gear 9 radially projects into the cavity 4. The fixed annular gear 9 is substantially perpendicular to the axis L1. The fixed annular gear 9 divides the cavity into an input portion 10 and an output portion 11.

According to the figures, the fixed annular gear 9 is manufactured as one single piece together with the casing 3, thus forming a single body; by so doing, the stiffness of the planetary gear 1 is increased and the times and costs needed to assemble the planetary gear 1 are reduced. According to a variant, which is not shown herein, the fixed annular gear 9 is distinct from the casing 3 and coupled to the casing 3.

The planetary gear 1 comprises, furthermore, a planet carrier 12, which is inserted into the casing 3 through the opening 7 in the input portion 10. The planet carrier 12 is coaxial to the axis L1 and is mounted so as to rotate around the axis L1.

In particular, the planet carrier 12 comprises a disc-shaped plate 13 having a central opening 14 with a circular shape, through which the pinion 2 can be inserted into the planetary gear 1. Advantageously, the opening 14 is configured to house a lubricant sealing system (known and, therefore, not shown), so as to seal the planetary gear 1 and protect it against contaminations. According to a variant, which is not shown herein, the opening 14 is configured to house a (known) bearing, which is capable of axially and/or radially constraining the position of the pinion 2, so as to improve the functionality and the precision of the planetary gear 1.

In a known manner, the planetary gear 1 comprises means interposed between the planet carrier 12 and the casing 3, so as ensure the relative rotation between said planet carrier 12 and said casing 3. For example, the planetary gear 1 comprises a bearing c1 and respective gaskets g1, which are fitted on the plate 13 of the planet carrier 12, so as to enable a relative rotation between the planet carrier 12 and the input portion 10 of the casing 3.

According to a variant, which is not shown herein, the bearing c1 between the planet carrier 12 and the casing 3 is not provided with the outer ring and the rollers of the bearing directly roll on the input portion 19 of the casing 3, which is properly prepared and processed. By so doing, the space taken up is reduced and the stiffness and compactness of the planetary gear 1 are increased.

The plate 13 of the planet carrier 12 is arranged, along the axis L1, beside the fixed annular gear 9, but it is spaced apart from the latter, so as to avoid relative frictions between the fixed annular gear 9 and the plate.

The planet carrier 12 comprises, furthermore, a plurality of pins 15, each having an axis L2, which is substantially parallel to the axis L1.

The pins 15 are uniformly distributed around the axis L1. In the example shown, there are three pins and they all project from the same side of the plate 13 into the cavity 4 towards the opening 6. According to a variant, which is not shown herein, the number of pins 15 is different and it depends on the type of application of the planetary gear 1. The fact that the pins 15 are manufactured as one single piece together with the plate 13 of the planet carrier 12 increases the stiffness and the resistance of the planetary gear 1, improving at the same time the cost-effectiveness and the compactness of the planetary gear 1. According to a variant, which is not shown herein, each pin 15 is a separate element connected to the plate 13 of the planet carrier 12.

In the example shown, each pin 15 has a cylindrical body, which longitudinally has: an end portion 16 and an intermediate portion 17 interposed between the end portion 16 and the plate 13. The end portion 16 has a smaller diameter than the diameter of the intermediate portion 17. Each pin 15 has a threaded hole 18, which is coaxial to the respective axis L2 and is made inside the end portion 16. The hole 18 communicates with the outside through an opening made close to the free end of the pin 15.

The planetary gear 1 comprises, furthermore, a plurality of planet gears 19. Each planet gear 19 comprises a gear with a beveloid toothing, hereinafter referred to as beveloid gear.

Figure 6:
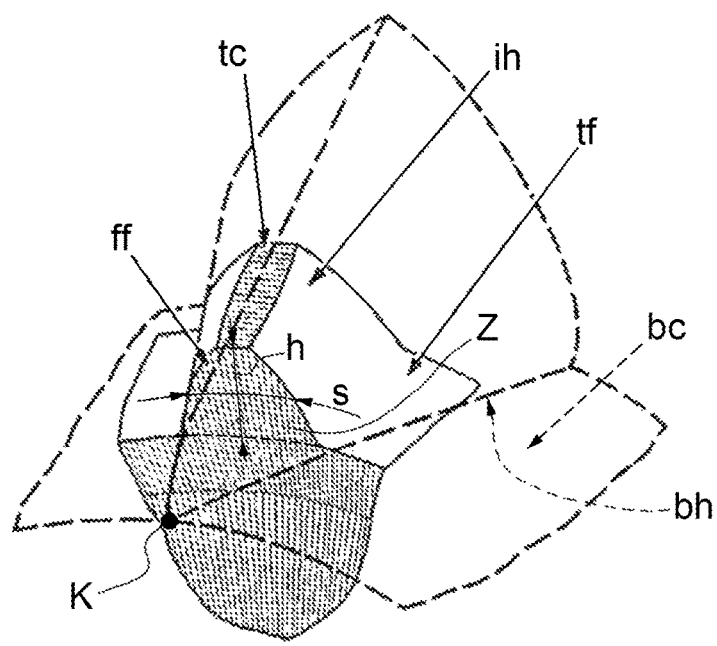
FIG. 6 shows a theoretical model of a gear with a beveloid toothing with straight teeth according to the invention.

By "gear with a beveloid toothing" or "beveloid gear" we mean a toothed involute gear, generally known as conical involute gear or beveloid gear (the theoretical model thereof is shown in FIG. 6) with a thickness s of the tooth Z, a root of the tooth and an outer diameter that are tapered along the axis of the pitch cylinder. The beveloid gears are not normal conical gears, as all the normal sections at the axis line represent the same cylindrical gear with straight teeth with its own value of the correction x. As the correction x linearly varies along the longitudinal direction of the tooth Z, the thickness s and the height h of the tooth Z increase when moving from the apex V along the longitudinal direction of the tooth Z.

FIG. 6 shows a theoretical model of a tooth Z of a beveloid gear with straight teeth. In FIG. 6, bc indicates the base cylinder and bh indicates the base helix, which is positive on one flank ih and negative on the other flank. In case the base helix bh on one flank ih has a value that is equal and opposite to the one of the other flank ih, you obtain a beveloid gear with straight teeth, otherwise the gear is defined as oblique gear. The origin of all involutes occurs starting from the base helix bh. All involutes join one another in the area of a crest K. The flank ih of the tooth Z is an involute helicoid. The tooth Z has a top land tc and a bottom land tf, which are tapered along the longitudinal direction of the tooth Z. In a beveloid gear with straight teeth, all the normal sections at the axis line represent a cylindrical gear with straight teeth with its own value of the correction x. FIG. 6 shows a front flat surface ff of the tooth Z.

Beveloid gears have been analysed and discussed in the following publications:
H. E. Merritt, "*Gears*", Pitman, London, 1955, pages 165-170;
A. S. Beam, "*Beveloid Gearing*", Machine Design, Vol. 26, December, 1954, pages 220-238;
S. C. Purkiss, "*Conical Involute Gears: Part 1*", Machinery 89, 1956, pages 1403-1420; and
C. C. Liu, C. B. Tsay, "*Contact characteristics of beveloid gears*", Mech. Mach. Theory, No. 37, 2002, pages 333-350.

In particular, each planet gear 19 comprises a beveloid gear with straight teeth. Each planet gear 19 has a taper γ.

The fixed annular gear 9 is internally toothed with a beveloid toothing similar to the one of the planet gears 19. The planet gears 19 have the apex V facing the input side E. By so doing, the pinion 2 can be inserted after the installation of the planetary gear 1 and the electric components (electric motor and pinion) can be removed and, if necessary, replaced without having to disassemble the planetary gear 1.

Each planet gear 19 has an inner through cavity 29, which is coaxial and has a substantially cylindrical shape. According to the example shown in the figures, the planetary gear 1 comprises three planet gears 19. Each planet gear 19 is fitted around the intermediate portion 17 of a respective pin 15 and meshes with the fixed annular gear 9. Each planet gear 19 is mounted in such a way that its taper γ is opposite to the taper of the fixed annular gear 9. In a known manner, the planetary gear 1 comprises a plurality of bearings c2 (in the case shown, three of them), each fitted around a respective pin 15 and interposed between the pin 15 and the corresponding planet gear 19. In the example shown, the bearing c2 is a needle roller bearing.

In case each pin 15 is a separate element connected to the plate 13 of the planet carrier 12, it is possible to provide a hardening treatment for each pin 15, so that each bearing c2 fitted between a respective pin 15 and a respective planet gear 19 can avoid being provided with the inner ring, thus having rollers that directly roll in contact with the pin 15. By so doing, the dimensions and the weight of the planetary gear 1 are reduced.

The planetary gear 1 comprises, furthermore, an output block 21, which is configured to transmit the motion to a respective arm (not shown) of a robotic machine. The output block 21 has a substantially cylindrical body and an inner cavity 22, which faces outwards through the end openings 23 and 24. The opening 23 faces the input side E and the opening 24 faces the output side O. The output block 21 is coaxial to the axis L1 and is mounted so as to rotate around the axis L1.

The output block 21 comprises, in turn a movable annular gear 24, which is coupled to the output block 21 in an angularly and axially fixed manner. The movable annular gear 25 radially projects into the cavity 22. The movable annular gear 25 is substantially perpendicular to the axis L1.

According to the figures, the movable annular gear 25 is manufactured as one single piece together with the output block 21, thus forming a single body; by so doing, the stiffness of the planetary gear 1 is increased and the times and costs needed to assemble the planetary gear 1 are reduced. According to a variant, which is not shown herein, the movable annular gear 25 can be coupled to the output block 21. The movable annular gear 25 can rotate around the axis L1 together with the output block 21.

The movable annular gear 25 is internally toothed with a beveloid toothing that is complementary to the toothing of the beveloid gears of the planet gears 19. In other words, the taper γ of the movable annular gear 25 is opposite to the taper γ of each planetary gear 19.

The output block 21 is inserted into the output portion 11 of the casing 3 and the movable annular gear 25 is arranged adjacent to the fixed annular gear 9. The fixed annular gear 9 is complementary to each planet gear 19. In other words, the movable annular gear 25 has a taper γ that is equal to the taper γ of the fixed annular gear 9. In particular, the taper γ of the movable annular gear 25 is opposite to the taper γ of each planetary gear 19.

According to the figures, the fixed annular gear 9 faces the input side E. The inner diameter of the fixed annular gear 9 has a smaller extension compared to the inner diameter of the movable annular gear 25.

The movable annular gear 25 and the fixed annular gear 9 are beside one another. The movable annular gear 25 and the fixed annular gear 9 are sufficiently spaced apart from one another, so as to allow an annular gear (25, the movable one) to rotate relative to the other annular gear (9, the fixed one) without frictions. Between the movable annular gear 25 and the fixed annular gear 9 there is a compartment v; preferably, the compartment v has an extension of some millimetres. Advantageously, the extension of the compartment v is such as to allow lubricant to flow towards the bearings c, so as to ensure an adequate lubrication. The extension of the compartment v depends on the type of application of the planetary gear 1.

In a known manner, the planetary gear 1 comprises bearings c3, c4 and respective gaskets g2, spacers d and scraper rings r fitted on the output block 21 so as to enable a relative rotation between the output block 21 and the casing 3. According to the example shown, the planetary gear 1 comprises a pair of rolling bearings c3, c4 in a back-to-back arrangement. Advantageously, the extension of the compartment v is such as to allow lubricant to flow towards the bearings c3, c4, so as to ensure an adequate lubrication.

The output block 21 comprises, furthermore, a flange 26, which radially projects into the planetary gear 1 close to the free end of the output block 21. Optionally, the planetary gear 1 comprises a plug 27 (shown in FIG. 3), which is configured to be inserted into and close the cavity 22 of the output block 21 and to be pushed against an inner abutment.

Each planet gear 19 simultaneously meshes both with the fixed annular gear 9 and with the movable annular gear 25. In particular, each planet gear 19 comprises one single beveloid gear, which simultaneously meshes both with the fixed annular gear 9 and with the movable annular gear 25.

The planetary gear 1 comprises, furthermore, for each planet gear 19, a backlash adjustment system 28, which is configured to axially push the respective planet gear 19 against the fixed annular gear 9 and the movable annular gear 25, so as to avoid possible backlashes.

Each system 28 comprises, in turn:
- a disc 29, which is fitted on the end portion 16 of the pin 15 and is axially pushed so as to strike against the respective planet gear 19;
- a spring 30, which is fitted on the end portion 16 and has an end in contact with the disc 29 and another end axially projecting from the end portion 16;
- a disc-shaped plate 31;
- a screw 32, which extends through the plate 31 and is screwed into the threaded hole 18 of the pin 15.

The screw 32 is configured to push the plate 31 towards the disc 30 and the planet gear 19, so as to pre-load the spring 30. By adjusting the degree of screwing of the screw 32 into the hole 18, one can adjust the axial force F with which to push the respective planet gear 19 against the movable annular gear 25 and the fixed annular gear 9, so as to eliminate the axial backlash. According to a variant, which is not shown herein, the adjustment system 28 can comprise, instead of the screw, a pre-loading element equivalent to the screw, namely a component that is configured to adjust the relative position between the disc 29 and the plate 31, so as to vary the pre-load of the spring 30.

According to FIGS. 1 to 3, the pinion 2 comprises a gear 33 with a beveloid toothing (also known a conical involute gear) and a shaft 34.

The pinion 2 is inserted, through the opening 14 of the planet carrier 12 and in a coaxial manner relative to the axis L1, into the casing 3, the output block 21 and the planet carrier 12. The gear 33 of the pinion 2 meshes with each planet gear 19. The taper γ of the gear 33 is opposite to the taper γ of each planetary gear 19.

Figure 4:
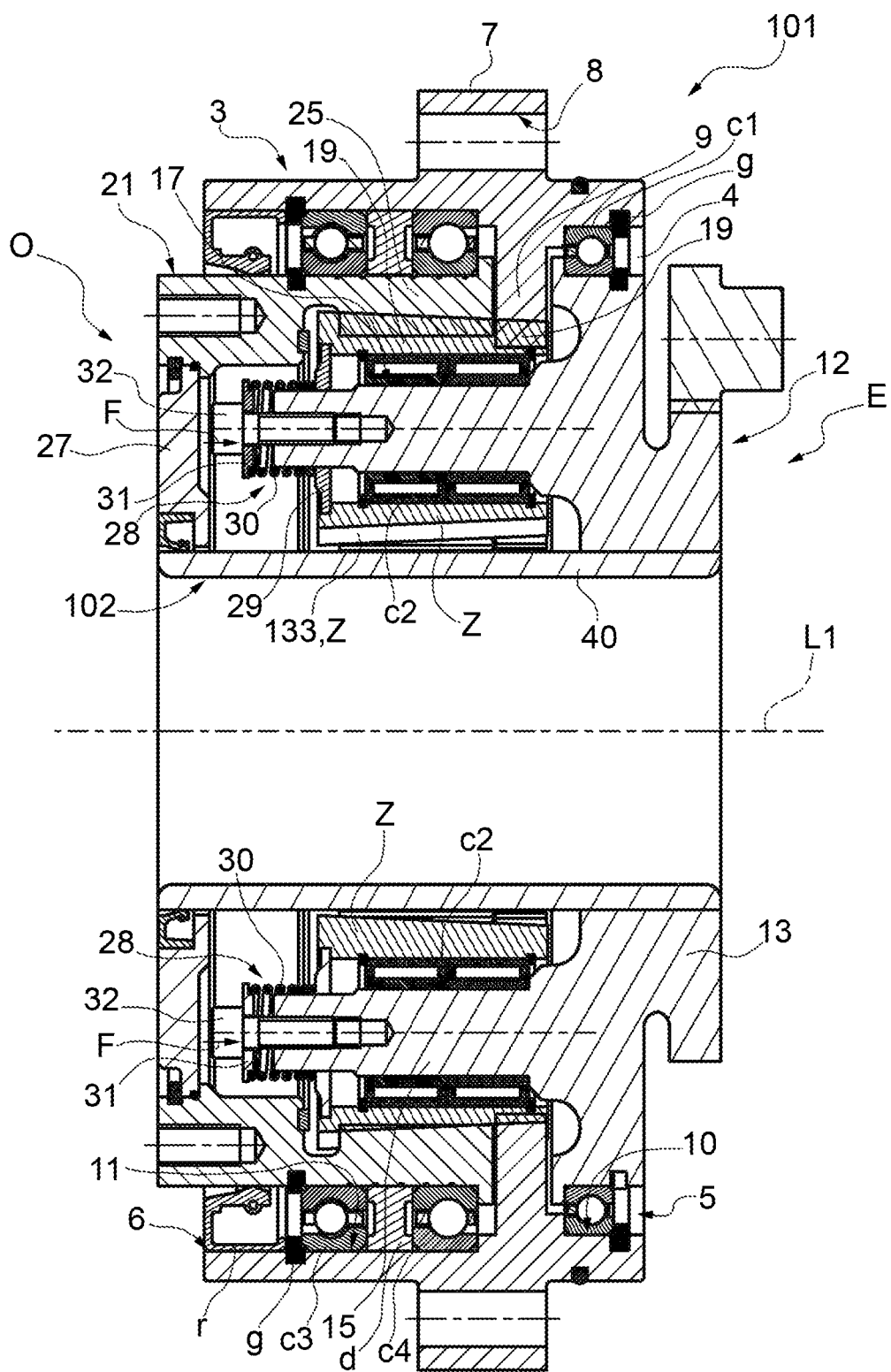
FIG. 4 shows a variant of the planetary gear according to the invention.

FIG. 4 shows a variant 101 of the planetary gear according to the invention; in particular, the planetary gear 101 is a planetary gear with a hollow through shaft.

In FIG. 4, the elements in common with the planetary gear 1 maintain the same reference numbers. The planetary gear 101 comprises a pinion 102, which comprises, in turn, a hollow shaft 40, which extends through the planetary gear 101 and is configured to connect, through its inner cavity, the input side E to the output side O.

The pinion 102 comprises a gear 133 with a beveloid toothing, which radially projects outwards from the shaft 40. The fixed annular gear 102 has a beveloid toothing that is similar to the one of the planet gears 19. The taper γ of the fixed annular gear 102 is opposite to the taper γ of the planetary gears 19. The pinion 102 is inserted through the casing 3, the output block 21 and the planet carrier 12. The fixed annular gear 102 meshes with each planet gear 19.

Figure 7:
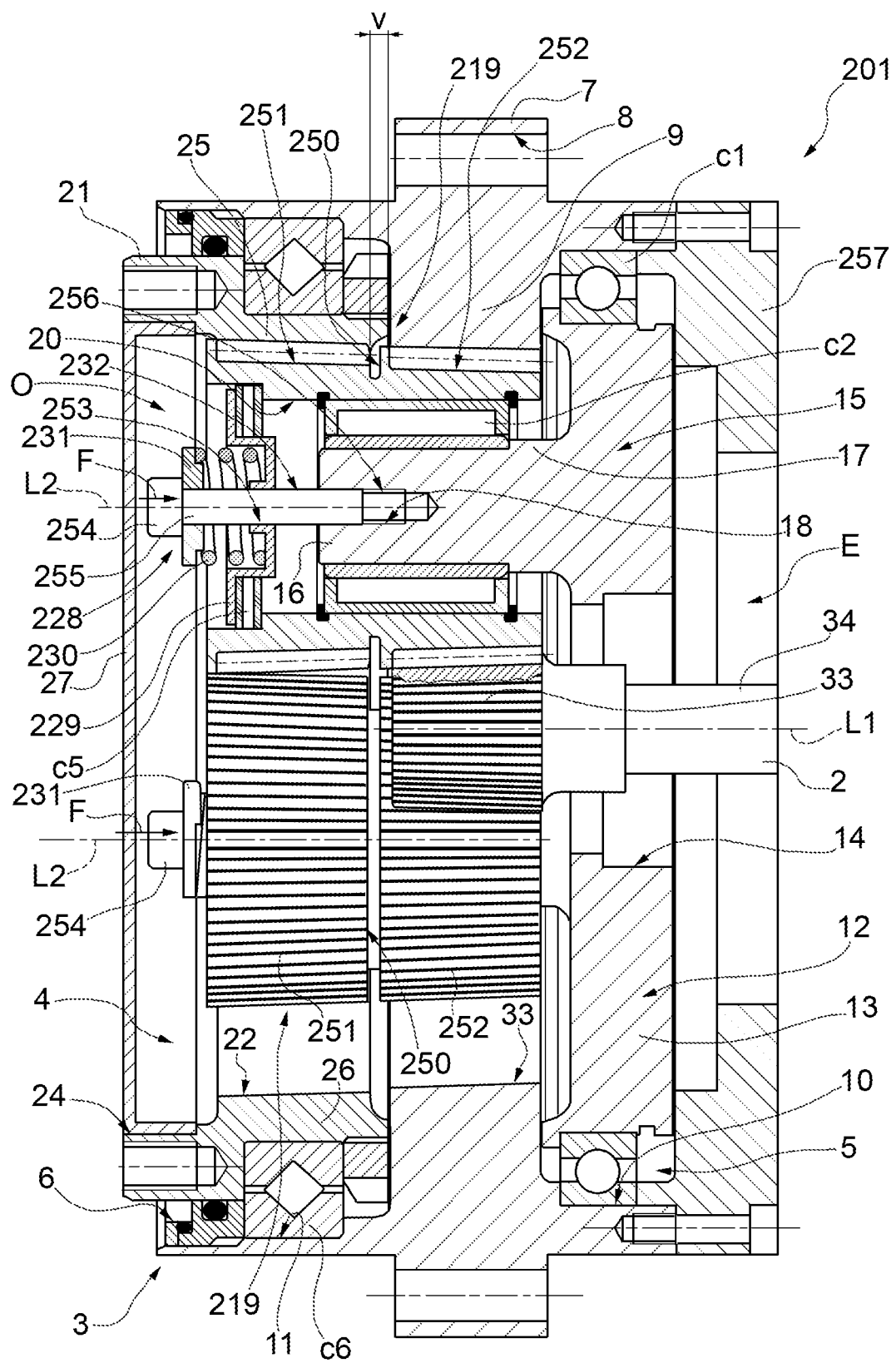
FIG. 7 shows a further variant of the planetary gear according to the invention.

FIG. 7 shown a variant 201 of the planetary gear according to the invention.

In FIG. 7, the elements in common with the planetary gear 1 maintain the same reference numbers. The planetary gear 201 comprises a variant, indicated with number 219, of the planet gear 19. In particular, the planet gear 219 has a groove 250. The groove 250 is annular and coaxial to the axis L2. The groove 250 was made on the beveloid toothing of the planet gear 219. The groove 250 axially separates two portions 251 and 252. The portion 251 meshes with the movable annular gear 25. The portion 252 meshes with the fixed annular gear 9 and with the pinion 2.

Advantageously, the groove 250 decreases the shear stress in the intermediate section of each portion 251 and 252. In other words, the groove 250 decreases the shear stress in the intermediate section of the portion 251 and, similarly, in the intermediate section of the portion 252. By so doing, the fatigue stress exerted upon the planet gears 219 during their use is reduced, thus increasing the life of the planet gears 219 as well as the duration and the reliability of the planetary gear 201.

Advantageously, the groove 250 allows each tooth of the planet gear 219 to be deformed in a uniform manner. By so doing, the entire tooth, comprising the portion 251 and the portion 252, simultaneously is engages in a mesh, thus allowing the planetary gear 201 to work in ideal conditions, which increases its duration and reliability.

Furthermore, in FIG. 7, number 228 indicates a variant of the backlash adjustment system 28.

According to FIG. 7, the system 228 comprises a bearing c5, a cup-shaped body 229, a screw 232, a spring 230 and a plate 231.

The bearing c5 is coaxial to the axis L2 and is mounted so as to axially strike against a respective planet gear 219. The bearing c5 is an axial needle roller bearing.

The cup-shaped body 229 is mounted so as to axially strike against the bearing c5; the bearing c5 being interposed between the cup-shaped body 229 and the planet gear 219.

The cup-shaped body 229 has a central hole 253, which is coaxial to the axis L2.

The screw 232 comprises a head 254 and a shank 255, which has a thread 256.

The plate 231 is fitted on the shank 255 of the screw 232 and is arranged in contact with the head 254.

The spring 230 is fitted on the shank 255 of the screw 232 and is in contact with the plate 231.

The screw 232 is screwed into the threaded hole 18 of the pin 15 so as to push the plate 231 towards the cup-shaped body 232, thus pre-loading the spring 230.

By adjusting the degree of screwing of the screw 232 into the hole 18, one can adjust the axial force F with which to push the respective planet gear 219 against the movable annular gear 25 and the fixed annular gear 9, so as to eliminate the axial backlash.

Advantageously, the presence of the bearing c5 interposed between the cup-shaped body 229 and the planet gear 219 allows users to reduce losses due to friction and backlash, reduce pollutants inside the planetary gear 201, limit the likelihood of unscrewing of the screw 232, and guide the spring.

Finally, the planetary gear 201, instead of the bearings c3 and c4, has crossed roller bearings c6, which increase the stiffness of the planetary gear 201.

According to a variant, which is not shown herein, the planetary gear 1 or 101 described above has an adjustment system 228 like the one shown in FIG. 7 instead of the adjustment system 28.

According to a variant, which is not shown herein, the planetary gear 1 or 101 comprises an interface system on the input side E, which allows users to customize the planetary gear 1 based on the different sources of motion, introduce interchangeable reduction pre-stages without affecting the precision of the planetary gear 1, and, in case of a planetary gear 1, obtain the version with a hollow through shaft. In FIG. 7 said interface system is shown and indicated with number 257.

FIG. 1 shows an operating diagram of the planetary gear 1, 101 or 201 described above. In particular, the pinion 2 or 102 is indicated with the Roman numeral I, each planet gear 19 or 219 with II, the fixed annular gear 9 with III, and the movable annular gear 25 with IV.

The difference of teeth Z between the fixed annular gear III and the movable annular gear IV is a multiple of the number of planet gears II. Preferably, the difference of teeth Z between the fixed annular gear III and the movable annular gear IV is equal to the number of planet gears II, so as to limit the size of the diameters and the tapers of the annular gears III and IV, which otherwise would be too large for the type of application envisaged.

The number of teeth of the fixed annular gear III and of the movable annular gear IV is regulated by the following equation:

$$z1 = z2 + n$$

wherein
z1=number of teeth of the annular gear with the greatest diameter, in this case the movable annular gear IV;
z2=number of teeth of the annular gear with the smallest diameter, in this case the fixed annular gear III; and
n=number of planet gears.

The fixed annular gear III, the movable annular gear IV and the planet gear II have the same module m.

According to FIG. 1, the planetary gear 1, 101 or 201 is a planetary gear with two stages S1 and S2, wherein the stage S1 is given by the meshing of the pinion I, the planet gear II and the fixed annular gear III; whereas the stage S2 is given by the meshing of the pinion I, the planet gear II and the movable annular gear IV.

Figure 5:
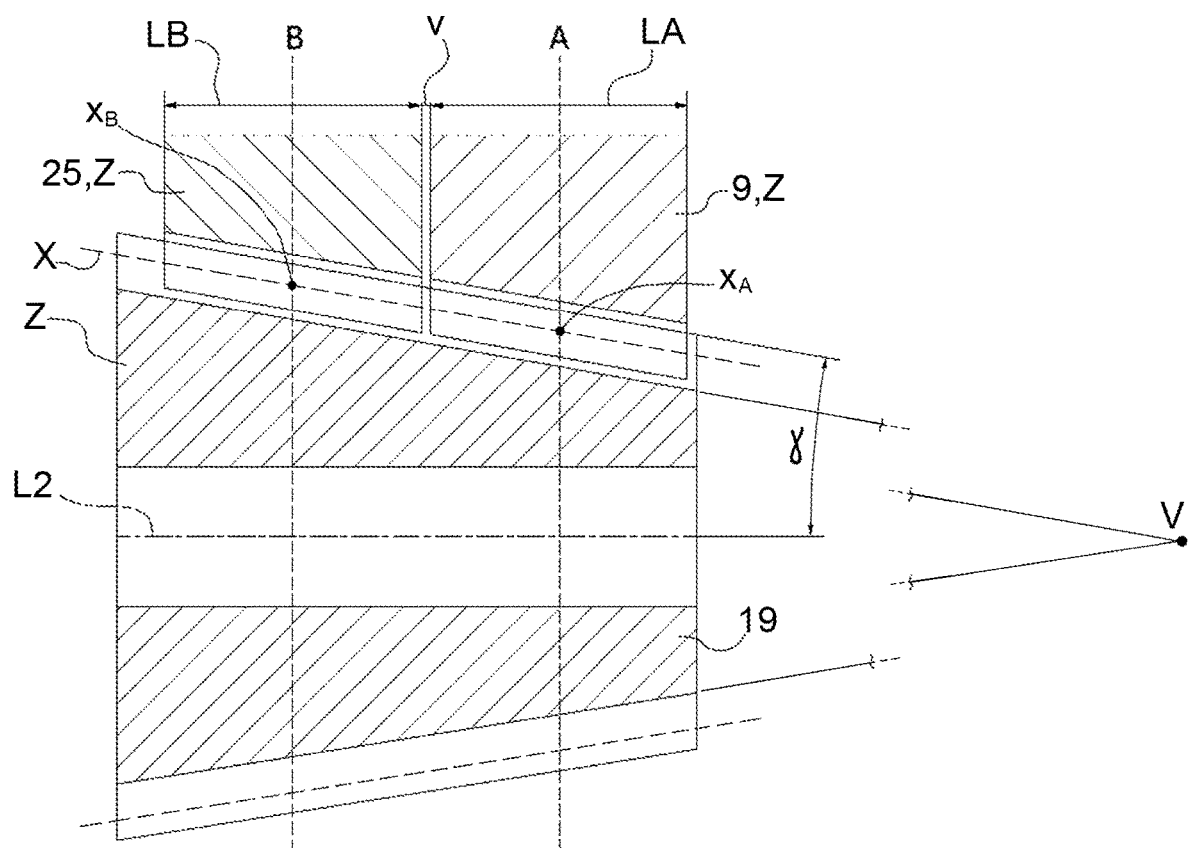
FIG. 5 is a schematic view of a detail of the planetary gear according to the invention.

With reference to the diagram shown in FIG. 5, the fixed annular gear II and the movable annular gear IV are linked to one another by the following relation:

$$x_B = x_A + \frac{\left(\frac{LA}{2} + v + \frac{LB}{2}\right) \cdot \tan\left(\frac{\gamma \cdot \pi}{180}\right)}{m}$$

wherein:
$x_B$ is the value of the correction of the planet gear II in the middle line B (schematically shown in FIG. 5) of the meshing with the annular gear with the greatest inner diameter, in this case the movable annular gear IV;
$x_A$ is the value of the correction of the planet gear II in the middle line A (schematically shown in FIG. 5) of the meshing with the annular gear with the smallest inner diameter, in this case the fixed annular gear III;
LA is the extension along the axis L2 of the annular gear with the smallest inner diameter, in this case the fixed annular gear III;
LB is the extension along the axis L2 of the annular gear with the greatest inner diameter, in this case the movable annular gear IV;
v is the distance between the fixed annular gear III and the movable annular gear IV along the axis L2;
γ is the taper of the planet gear II, of the fixed annular gear III and of the movable annular gear IV; and
m is the module of the fixed annular gear III, of the movable annular gear IV and of the pinion I.

Preferably, the taper γ has a value ranging from 1° to 3°.

In a known manner, we define as module m of a toothed annular gear the ratio between the pitch diameter and the number of teeth of the toothed annular gear itself. Namely, according to the known technique:

$$m = \frac{2R}{z}$$

wherein:
2R is the diameter of the circumference addendum circle of the toothed annular gear;
z is the number of teeth of the toothed annular gear.

In use, the pinion I is driving and causes the rotation of the planet gears II, which, as a consequence, rotate on the fixed annular gear III and, in turn, cause the rotation of the movable annular gear IV, which is driven.

Using beveloid gears both for the planet gears II and for the pinion I has the following advantages:
the beveloid gears (I and II) can be coupled to one another with intersecting axes, with no need to have the apex V of the cones in common, like in the coupling of conical gears;

the value of the cone angle is linked neither to the value of the angle between the axes of the gears nor to the transmission ratio; therefore, the beveloid gears (I and II) can be coupled to one another obtaining any type of gear ratio and angle between the axes;

the effects of possible assembling mistakes are eliminated, as axial movements and small variations of the angle between the axes do not affect the operation of the planetary gear 1 or 101;

processing mistakes that can produce variations of the cone angle, of the thickness of the teeth Z or of the helix do not affect the meshing between the beveloid gears (I and II);

in case the beveloid gears (I and II) are mounted so as to mesh with one another with parallel axes, possible backlashes are eliminated by axially pushing the beveloid gears against one another; and the beveloid gears (I and II) meshing with one another are configured in such a way that the contact takes place close to the centre of the face of the tooth Z, by so doing the beveloid gears (I and II) operate more delicately and silently compared to conical or cylindrical gears.

Advantageously, the fact that each planet gear 19 or 219 comprises one single beveloid gear in contact both with the fixed annular gear 9 and with the movable annular gear 25 allows each planet gear 19 or 219 to be ground with one single run of grinding wheel. In other words, the fact that each planet gear 19 or 219 comprises one single beveloid gear allows users to reduce processing and assembling times, increase the quality and the precision of the planet gear 19 or 219, and obtain small tolerances, thus increasing the precision of the planetary gear 1, 101 or 201 as a whole.

The backlash adjustment system 28 or 228 has the advantage of minimizing the backlash among the planet gear II, the fixed annular gear III and the movable annular gear IV; therefore, there is a reduction of the errors of angular transmission among the beveloid gears of the planet gear II, of the fixed annular gear III and of the movable annular gear IV, as this backlash is the main cause for errors of angular transmission.

The adjustment system 28 or 228 described above has the advantage of being especially compact, thus minimizing both the space taken up in a longitudinal direction and the weight of the planetary gear 1, 101 or 201.

The adjustment system 28 or 228 comprising a spring 30 or 230, namely an adjustment organ with an elastic coefficient variable within a wide range, which is pre-loaded by a screw 32 or 232, namely a fastening means whose stroke is adjustable within a wide range, allows users to obtain a large spectrum of pre-loading forces F with the mere choice of the type of spring and/or of the degree of screwing of the screw 32 or 232. By so doing, the same planetary gear 1, 101 or 201 can be easily and quickly adjusted to different uses, in particular the axial force F acting upon the planet gears 19 or 219 can be adjusted based on the axial movement thereof during the use.

Advantageously, the fact of providing an independent adjustment system 28 or 228 for each planet gear 19 or 219 enables ad hoc adjustments for each planet gear 19 or 219. By so doing, each planet gear 19 or 219 is always in a zero-backlash meshing condition, regardless of possible eccentricities or misalignments of the fixed annular gear 9 and/or of the movable annular gear 25 and/or of the planet gear 19 or 219.

Advantageously, thanks to the uniform distribution of the load transmitted by the pinion 2 or 102 to each planet gear 19 or 219 and because of the fact that the axis L2 of the pins 15 is parallel to the axis L1 of the pinion 2 or 102, the planetary gear 1, 101 or 201 has greater stiffness and precision with a reduced noise production. Advantageously, these results are improved by the application of a bearing (not shown) between the shaft 34 of the pinion 2 and the opening 14 of the planet carrier 12.

The planetary gear 1, 101 or 201 described above ensures great reductions with performances that are competitive compared to those of traditional planetary gears.

The planetary gear 1, 101 or 201 described above is a highly compact and precise planetary gear. In particular, in the planetary gear 1, 101 or 201, the limited number of components allows manufacturers to improve precision, increase the stiffness (and, thus, the positioning precision) and reduce manufacturing costs.

The planetary gear 1, 101 or 201, thanks to its structure, has minimized backlashes, vibrations and inertias; this leads to the advantage of ensuring quick accelerations, delicate movements and high positioning precision.

The invention claimed is:

1. A precision planetary gear comprising: a pinion having a first rotation axis, a movable annular gear, a fixed annular gear, one or more planet gears; the movable annular gear and the fixed annular gear being coaxial to said first axis; each planet gear having a second rotation axis; said first and second axes being substantially parallel to one another; each planet gear simultaneously meshing with the pinion, the fixed annular gear and the movable annular gear; the pinion comprising a gear with a beveloid toothing; each planet gear comprising a gear with a beveloid toothing; wherein a beveloid toothing has a correction, which linearly varies along the longitudinal direction of each tooth.

2. The precision planetary gear according to claim 1, wherein each planet gear is interposed, radially relative to said first axis, both between the pinion and the fixed annular gear and between the pinion and the movable annular gear.

3. The precision planetary gear according to claim 1, wherein the pinion, the movable annular gear and the fixed annular gear have a taper that is equal and opposite to a taper of each planet gear.

4. The precision planetary gear according to claim 1, wherein the fixed annular gear and the movable annular gear are directly arranged next to one another along said first axis; wherein there is provided a compartment between the movable annular gear and the fixed annular gear; an extension of the compartment along the first axis being adapted to avoid mutual friction between the fixed annular gear and the movable annular gear.

5. The precision planetary gear according to claim 1, wherein the planet gear, the fixed annular gear and the movable annular gear have the same module.

6. The precision planetary gear according to claim 1, wherein the number of teeth of the fixed annular gear and of the movable annular gear is given by the following equation:

$$z1=z2+n$$

wherein z1 is the number of teeth of the annular gear with the greatest diameter;

z2 is the number of teeth of the annular gear with the smallest diameter; and n is the number of planet gears.

7. The precision planetary gear according to claim 1, wherein the fixed annular gear and the movable annular gear are linked to one another by the following equation:

$$x_B = x_A + \frac{\left(\frac{LA}{2} + v + \frac{LB}{2}\right) \cdot \tan\left(\frac{\gamma \cdot \pi}{180}\right)}{m}$$

wherein:
- $x_B$ is the value of the correction of the planet gear in the middle line of the meshing with the annular gear with the greatest inner diameter;
- $x_A$ is the value of the correction of the planet gear in the middle line of the meshing with the annular gear with the smallest inner diameter;
- LA is the extension along the second axis of the annular gear with the smallest inner diameter;
- LB is the extension along the second axis of the annular gear with the greatest inner diameter;
- v is the extension of the compartment between the fixed annular gear and the movable annular gear along the second axis;
- γ is the taper of the planet gear, of the fixed annular gear and of the movable annular gear; and
- m is the module (m) of the fixed annular gear, of the movable annular gear and of the pinion.

8. The precision planetary gear according to claim 1, further comprising one or more adjustment means, which are configured to limit the backlash between each planet gear and the fixed annular gear as well as the movable annular gear; wherein each adjustment means is configured to exert an axial force pushing each planet gear against the movable annular gear and the fixed annular gear.

9. The precision planetary gear according to claim 8, further comprising an adjustment means for each planet gear; wherein each adjustment means comprises, in turn: a first striker element, which is engaged to a respective planet gear; a spring; a second striker element; and a pre-load element; wherein the spring is interposed between the first and the second striker element and the pre-load element is configured to vary the position of the second striker element relative to the first striker element, so as to accordingly vary the pre-load of the spring against the first striker element and, consequently, against the respective planet gear.

10. The precision planetary gear according to claim 9, wherein the first and the second striker elements are two disc elements; each adjustment means comprising, as a pre-load element, a screw, around which the spring, the first and the second striker element are fitted; wherein each planet gear has a threaded hole, which is configured to, at least partially, house said screw; wherein the pre-load of the spring of each adjustment means is proportional to the degree of screwing of the screw into the respective hole.

11. The precision planetary gear according to claim 9, wherein each adjustment means comprises a bearing, which is interposed along the second axis between the first striker element and the respective planet gear.

12. The precision planetary gear according to claim 1, wherein the gear with a beveloid toothing of each planet gear has an annular groove, which is coaxial to the second axis and axially separates a first and a second portion of the gear with the beveloid toothing; wherein the first portion meshes with the movable annular gear and the second portion meshes with the fixed annular gear.

13. The precision planetary gear according to claim 2, wherein the planetary gear has two stages.

14. The precision planetary gear according to claim 3, wherein each planet gear comprises a taper with a value ranging from 1° to 3°.

15. The precision planetary gear according to claim 6, wherein the annular gear with the greatest diameter is the movable annular gear.

16. The precision planetary gear according to claim 6, wherein the annular gear with the smallest diameter is the fixed annular gear.

17. The precision planetary gear according to claim 7, wherein the annular gear with the greatest inner diameter is the movable annular gear.

18. The precision planetary gear according to claim 7, wherein the annular gear with the smallest inner diameter is the fixed annular gear.

19. The precision planetary gear according to claim 11, wherein the bearing (c5) is an axial needle roller bearing.

* * * * *